United States Patent [19]

Ferdinand et al.

[11] Patent Number: 4,896,778
[45] Date of Patent: Jan. 30, 1990

[54] ELONGATE MEMBER CONNECTION TO AN END PLATE

[75] Inventors: Mark Ferdinand, Glencoe; Milton E. Handler, Northbrook; Richard Sylvan, Glenview; Herbert Baisch, Palatine, all of Ill.

[73] Assignee: Hirsh Company, Skokie, Ill.

[21] Appl. No.: 287,832

[22] Filed: Dec. 21, 1988

[51] Int. Cl.⁴ .............................................. A47F 5/00
[52] U.S. Cl. .................................. 211/175; 211/182; 211/189; 403/260
[58] Field of Search ................. 211/189, 182, 175, 37, 211/34; 403/262, 230, 264, 260, 258

[56] References Cited

U.S. PATENT DOCUMENTS

| | | | |
|---|---|---|---|
| 1,346,518 | 7/1920 | Waggoner | 403/258 X |
| 2,431,423 | 11/1947 | Robbins | 211/37 |
| 2,557,766 | 6/1951 | Ronfeldt | 403/258 X |
| 3,311,242 | 3/1967 | Miklya | 211/37 |
| 4,367,864 | 1/1983 | Eldeen | 403/262 X |
| 4,632,473 | 12/1986 | Smith | 211/182 X |

FOREIGN PATENT DOCUMENTS 2406227 2/1975 Fed. Rep. of Germany ...... 403/264

OTHER PUBLICATIONS

Cedar shoe rack advertisement.
Advertisement for "Storage Systems by Lee/Rowan" for shoe rack with white epoxy finish.
C, D, E, and F:1988 Builder Products Lee/Rowan catalog sheets for storage systems products including shoe racks.

Primary Examiner—Robert W. Gibson, Jr.
Attorney, Agent, or Firm—Dressler, Goldsmith, Shore, Sutker & Milnamow, Ltd.

[57] ABSTRACT

An improved structure is provided for connecting an end of an elongate member to an end plate. The end plate is provided with an aperture for receiving a fastener having a threaded shank adapted for extending through the aperture and having a head for engaging the end plate. The structure includes at least a first slot in the elongate member. A retaining member is provided for being positioned in the elongate member slot. The retaining member has two oppositely extending end portions for each projecting laterally beyond the elongate member and engaging the elongate member. The retaining member defines a threaded bore for threadingly receiving the threaded shank of the fastener.

10 Claims, 1 Drawing Sheet

U.S. Patent  Jan. 30, 1990  4,896,778
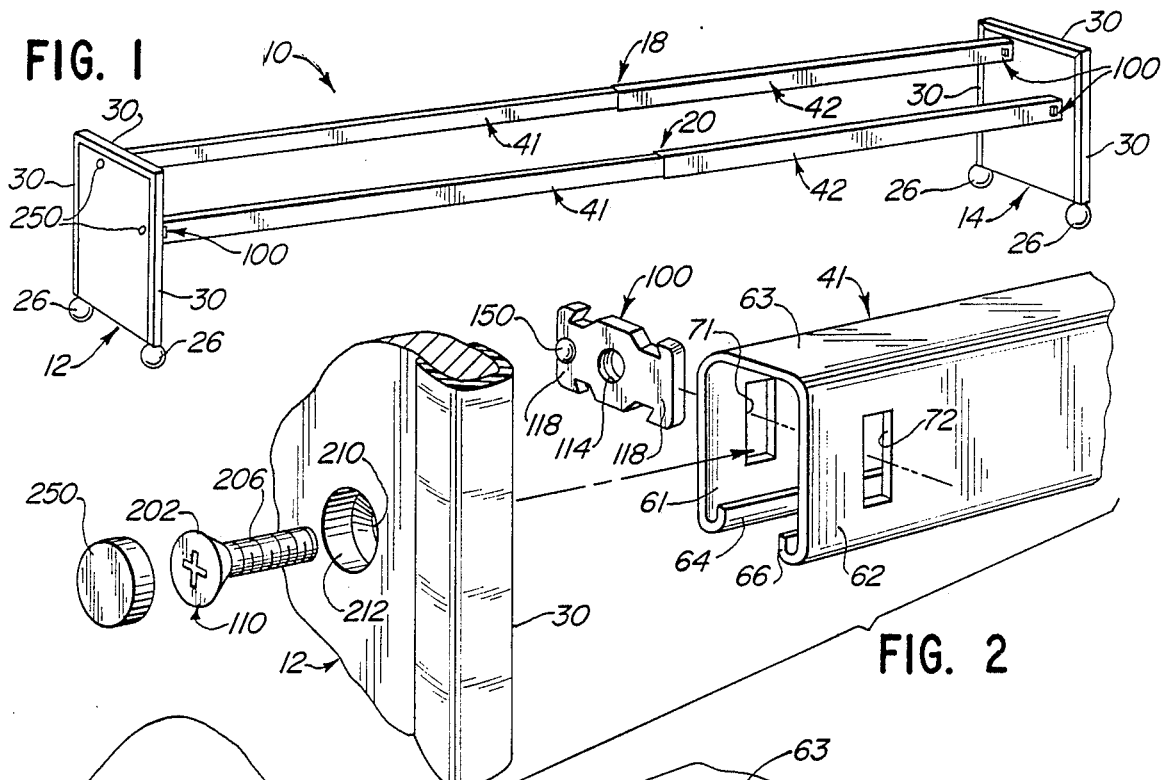
FIG. 1
FIG. 2
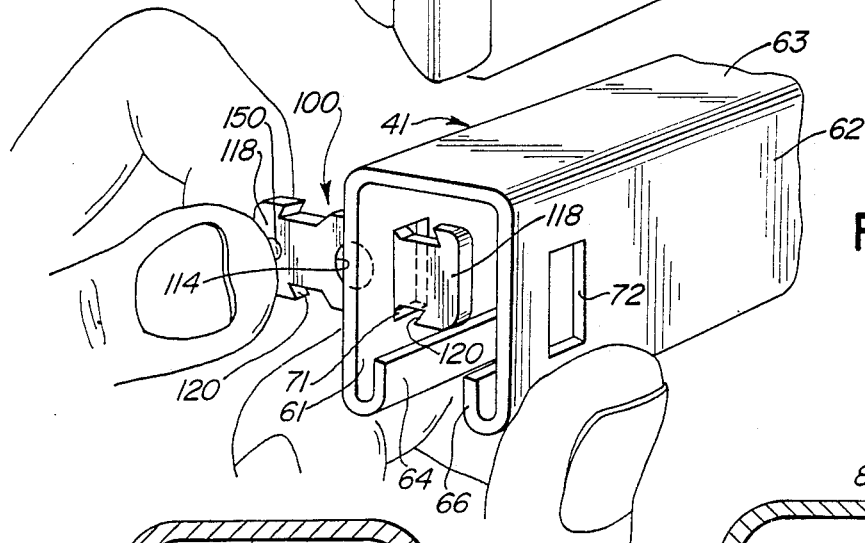
FIG. 3
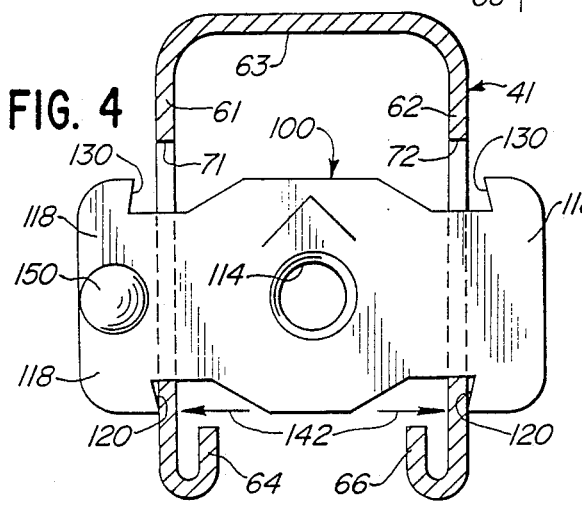
FIG. 4
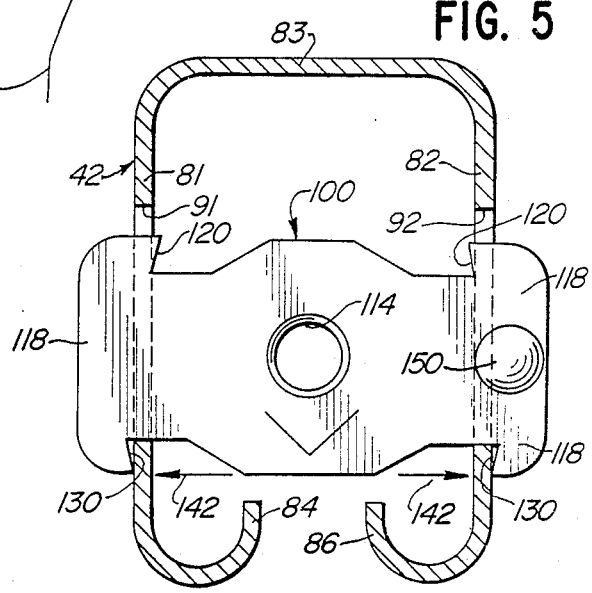
FIG. 5

ELONGATE MEMBER CONNECTION TO AN END PLATE

TECHNICAL FIELD

This invention relates to an improved structure for connecting an end of an elongate member to an end plate. The invention is particularly well suited for facilitating the quick assembly of components to form a rack, especially a rack in which two different size elongate members are employed.

BACKGROUND OF THE INVENTION AND TECHNICAL PROBLEMS POSED BY THE PRIOR ART

Various products have been marketed or proposed for functioning as a rack or other support structure which includes at least one elongate member extending from at least one supporting end plate. The elongate member may be cantilevered from just one supporting end plate or may extend between two supporting end plates.

In order to reduce assembly costs and reduce packaging and shipping costs, some of these types of products are sold to the customer as a knocked-down or unassembled set of components. The customer or other ultimate user then assembles the components.

It would be desirable to provide a set of components for being assembled into such a product wherein the assembly could be relatively easily and quickly effected.

Further, it would be advantageous if the connections between the components in the completed assembly were relatively tight and strong.

Additionally, it would be desirable if the number of connecting components required to complete the assembly could be kept to a minimum.

Also, it would be advantageous if one or more of the connecting components each had a configuration that would permit the component to be used in one of a number of different connection locations.

Further, it would be beneficial if a connection component could be provided with a configuration so as to accommodate its use with having more than one size. This would permit a plurality of identical connecting components to be used in an assembly having different size parts to be connected. This would simplify the assembly process.

SUMMARY OF THE INVENTION

An improved structure is provided for connecting an end of an elongate member to an end plate. An aperture means is provided for defining an aperture through the end plate. The structure includes a fastener having a threaded shank adapted for extending through the aperture and having a head for engaging the end plate.

The structure includes a slot means for defining at least a first slot in the elongate member. A retaining member is provided for being positioned in the elongate member slot and having two oppositely extending end portions for each projecting laterally beyond the elongate member and engaging the elongate member. The retaining member defines a threaded bore for threadingly receiving the threaded shank of the fastener.

In a preferred embodiment of the invention, the elongate member has wall means for defining first and second spaced-apart side walls connected by a cross wall. The first and second side walls define first and second slots, respectively. The retaining member is positioned in the elongate member with each end portion projecting through one of the slots and laterally beyond the associated side wall so as to engage the outer surface of the associated side wall.

Preferably, the end portions of the retaining member define a first pair of spaced-apart projecting engaging surfaces for engaging the elongate member side walls. Also, the end portions of the retaining member preferably also define a second pair of spaced-apart projecting engaging surfaces for engaging side walls of another, different size engaging member. This allows identical shaped retaining members to be used for assembling products having two different size elongate members.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a perspective view of a rack employing the improved components and connecting structure of the present invention;

FIG. 2 is a greatly enlarged, fragmentary, exploded, perspective view of the connection structure components of the rack shown in FIG. 1;

FIG. 3 is a more greatly enlarged view showing the insertion of a retaining member of the present invention in an elongate member prior to being connected to a supporting end plate (the end plate not being shown in FIG. 3);

FIG. 4 is a even more greatly enlarged cross-sectional view showing the retaining member fully inserted and engaged with the elongate member; and FIG. 5 is a view similar to FIG. 4 but showing the retaining member inverted and engaged with another elongate member that is larger than the elongate member illustrated in FIG. 4.

DESCRIPTION OF THE PREFERRED EMBODIMENT

While this invention is susceptible of embodiment in many different forms, this specification and the accompanying drawings disclose only some specific forms as an example of the use of the invention. The invention is not intended to be limited to the embodiments so described, and the scope of the invention will be pointed out in the appended claims.

A shoe rack 10 embodying the components of the present invention is illustrated in FIG. 1. The shoe rack 10 has a left-hand end plate 12 and a right-hand end plate 14. The end plates 12 and 14 support, and are connected together by, a pair of telescoping rod assemblies 18 and 20. The rod assemblies 18 and 20 are identical and function to support shoes or other similar articles placed thereon.

The bottom end of each end plate 12 and 14 is preferably provided with a foot structure, such as a pair of spaced-apart ball-type feet 26. The edges of each end plate 12 and 14 may be covered with decorative, channel-shaped, trim members 30.

Each telescoping rod assembly 18 and 20 includes a first channel member 41 and a second channel member 42. The first channel member, as best illustrated in FIGS. 2 and 4, has a first side wall 61, a second side wall 62, and a cross wall 63 which connects the first side wall 61 with the second side wall 62. The bottom of the first wall 61 is provided with an upturned lip 64, and the bottom of the second side wall 62 is provided with an upturned lip 66.

The first side wall 61 defines a vertically oriented, elongate slot 71, and the second side wall 62 defines a second vertically oriented, elongate slot 72. The slots 71 and 72 are disposed near the end of the channel 41 which is adjacent the end plate 12.

The second channel member 42 (FIGS. 1 and 5) has a first side wall 81 and a second wide wall 82. A cross wall 83 connects the first side wall 81 with the second side wall 82. The bottom of the first side wall 81 is provided with an upturned lip 84, and the bottom of the second side wall 82 is provided with an upturned lip 86.

Near the end of the second channel member 42 adjacent the end plate 14, the second channel member first wall 81 defines a vertically oriented, elongate slot 91. Similarly, the second wall 82 defines a vertically oriented, elongate slot 92.

The second channel member 42 has a configuration substantially similar to that of the first channel member 41. However, as best seen by comparing FIG. 4 with FIG. 5, the overall cross-sectional height and width of the first channel member 41 is less than the overall cross-sectional height and width of the second channel member 42. The size relationship between the two channel members 41 and 42 is such that the first channel member 41 can be slidably and telescopicly received within the second channel member 42.

The end of the first channel member 41 adjacent the end plate 12 is adapted to be secured to the end plate 12 by means of a unique retaining member 100 employed in conjunction with a threaded fastener member, such as a screw 110. The end of the channel member 42 adjacent the end plate 14 is similarly adapted to be connected to the end plate 14.

The retaining member 100 defines a central, threaded bore 114 and has two oppositely extending end portions 118 (FIG. 2). With reference to FIG. 4, the retaining member 100 end portions 118 define, along the bottom edge of the retaining member 100, a first pair of spaced-apart projecting engaging surfaces 120. When the retaining member 100 is positioned through the first and second slots 71 and 72, respectively, of the first channel member 41 as illustrated in FIG. 4, the engaging surfaces 120 engage the first channel member side walls 61 and 62 below the associated slots 71 and 72.

Along the top edge of the retaining member illustrated in FIG. 4, the end portions 118 define a second pair of spaced-apart projecting engaging surfaces 130. The distance between the engaing surfaces 130 is greater than the distance between the engaging surfaces 120. This permits the retaining member 100 to be inverted as illustrated in FIG. 5 and positioned in the slots 91 and 92 of the second channel member 42 so that the engaging surfaces 130 engage the walls 81 and 82 below the associated slots 91 and 92, respectively.

The novel configuration of the retaining member 100 permits a plurality of identical retaining members 100 to be employed for connecting the different size channel members 41 and 42 to the end plates 12 and 14, respectively.

FIG. 3 illustrates the process of assembling a retaining member 100 and a channel member 41. The bottom portions of the side walls 61 and 62 of the channel member 41 are grasped and squeezed slightly together while an end of the retaining member 100 is inserted through the slot in one side wall and then through the slot in the other side wall. When the retaining member engaging surface 120 on the leading end of the retaining member has just cleared the second wall, the two walls 61 and 62 are released so that they spring outwardly as indicated by the arrows 142 in FIG. 4 to contact the retaining member engaging surfaces 120.

An identical retaining member 100 can similarly be disposed in the other channel member 42, but with the retaining member 100 being positioned in the inverted position so that the more greatly spaced-apart engaging surfaces 130 can accommodate the greater spacing between the side walls 81 and 82 of the wider channel member 42 as illustrated in FIG. 5.

The retaining member 100 may optionally be provided with a protrusion 150 on one end portion 118 to facilitate a rapid and proper positioning of the retaining member 100 in the selected channel member 41 or 42. In particular, the protrusion 150 may take the form of a hemispherical protuberance on one side of the retaining member 100. The protuberance 150 projects sufficiently outwardly to prevent the retaining end portion with the protuberance 150 from being inadvertently inserted so far into the channel member that the engaging surfaces 120 or 130 would not properly engage the channel member walls below the slots.

Once the retaining member 100 has been properly inserted into the selected channel member 41 or 42 as illustrated in FIGS. 4 and 5, respectively, the assembly may be connected to the end plate 12 or 14 with the screw 110. The screw preferably includes a conventional head 202 for engaging the end plate 12 or 14 and a threaded shank 206 for extending through the end plate 12 or 14 and being threadingly engaged with the threaded bore 114 of the retaining member 100. To this end, as illustrated in FIG. 2 for the end plate 12, the end plate defines a suitable aperture 210 (FIG. 2) which may include an appropriate, countersunk bore 212 for receiving the screw head 202. The screw 110 is tightened sufficiently in the retaining member 100 to draw the end of the channel member 41 or 42 tight against the end plate 12 or 14, respectively, so as to provide a strong connection. Subsequently, a cosmetic, cylindrical end cap 250 may be press fitted into position over the screw head 202.

The ends of each of the channel members 41 and 42 adjacent the associated end plates may be all similarly connected to the end plates.

The preferred embodiment of the retaining member 100 includes two pairs of spaced-apart engaging surfaces 120 and 130, and this permits, as explained in detail above, a plurality of identically shaped retaining members 100 to be used for connecting different size channel members to the end plates.

However, it will be appreciated that, if desired, different types of retaining members could be provided. For example, one type of retaining member may have only the more closely spaced-apart engaging surfaces 120 for use with the smaller channel member 41 while another type of retaining member may have only the more greatly spaced-apart engaging surfaces 130 for use with the larger channel members 42.

It is seen that the novel retaining member 100 of the present invention can be easily and properly assembled with the channel member, or other elongate member, which is to be secured to an end plate. Owing to the unique configuration of the retaining member 100, the proper positioning of the retaining member 100 within the channel member (or other elongate member) is readily determined and easily accomplished.

Owing to the novel configuration of the retaining member 100 and cooperating structure of the associated channel member, the retaining member 100 is held securely in position once it has been properly inserted. Thus, the person assembling the components does not have to continue to use his fingers (or any tools) for holding the retaining member 100 and channel member together as the end plate 12 or 14 is attached with the screw 110.

Although the present invention has been illustrated as being employed in a rack, it will be appreciated that the invention may be provided for generally connecting an end of an elongate member to an end plate, including an elongate member cantilevered to just one end plate.

Further, although the present invention has been described with respect to use with elongate channel members, it will be appreciated that the elongate member may have some other cross-sectional configuration. Indeed, an elongate member may have a substantially solid interior with a suitable bore for accommodating the fastener shank and with one, continuous slot extending from one side of the member to the other for accommodating the retaining member 100.

It will be readily observed from the foregoing detailed description of the invention and from the foregoing illustrated embodiment thereof that numerous variations and modifications may be effected without departing from the true spirit and scope of the novel concepts or principles of this invention.

What is claimed is:

1. A set of components for being assembled into a rack, said set of components comprising:
    at least one end plate defining an aperture;
    a fastener having a threaded shank adapted for extending through said aperture and having a head for engaging said end plate;
    at least one elongate member for extending from said end plate and defining at least a first slot; and
    a retaining member for being positioned in said elongate member through said first slot, said retaining member having two oppositely extending end portions for each projecting laterally beyond said elongate member and for engaging said elongate member, said retaining member defining a threaded bore for threadingly receiving the threaded shank of said fastener.

2. The set of components in accordance with claim 1 in which
    said one elongate member is a first channel member having first and second side walls connected by a cross wall;
    said first slot is defined in said first side wall;
    said second side wall defines a second slot; and
    said retaining member has a length sufficient to permit one of said retaining member end portions to project from said first slot and the other of said retaining member end portions to project from said second slot.

3. The set of components in accordance with claim 2 in which both of said slots are each located the same distance from an end of said channel member and are generally in alignment with each other.

4. The set of components in accordance with claim 2 in which said end portions of said retaining member define a first pair of spaced-apart projecting engaging surfaces for engaging said channel member side walls below the associated slots defined in said side walls.

5. The set of components in accordance with claim 4 in which the distance between said retaining member engaging surfaces of said first pair of engaging surfaces is less than the distance between the outer surfaces of said channel member side walls in the unassembled condition whereby said side walls are deflected inwardly when engaged by said first pair of engaging surfaces of said retaining member.

6. The set of components in accordance with claim 5 in which
    said set of components further include a second channel member having first and second side walls connected by a cross wall with the outer surfaces of said second channel member side walls being spaced further apart than the outer surfaces of said first channel member side walls, said second channel member first and second side walls defining, respectively, first and second slots;
    said end portions of said retaining member define a second pair of spaced-apart projecting engaging surfaces for engaging, when the retaining member is inverted, said second channel member side walls below the associated slots defined in said side walls; and
    the distance between said retaining member engaging surfaces of said second pair of engaging surfaces is greater than the distance between said engaging surfaces of said first pair of engaging surfaces and is less than the distance between the outer surfaces of said second channel member in the unassembled condition whereby said second channel member side walls must be deflected inwardly to be engaged by said second pair of engaging surfaces of said retaining member when said retaining member is inverted.

7. The set of components in accordance with claim 5 in which said retaining member includes a region of increased thickness on one of said end portions to prevent said one end portion from passing through at least said first slot in said first channel member.

8. An improved structure for connecting an end of an elongate member to an end plate, said improved structure comprising:
    aperture means for defining an aperture through said end plate;
    a fastener having a threaded shank adapted for extending through said aperture and having a head for engaging said end plate;
    slot means for defining at least a first slot in said elongate member; and
    a retaining member for being positioned in said elongate member first slot and having two oppositely extending end portions for each projecting laterally beyond said elongate member and engaging said elongate member, said retaining member defining a threaded bore for threadingly receiving the threaded shank of said fastener.

9. An improved structure for connecting an end of an elongate member to an end plate, said improved structure comprising:
    said end plate having aperture means for defining an aperture through said end plate;
    a fastener having a threaded shank adapted for extending through said aperture and having a head for engaging said end plate;

said elongate member having wall means for defining first and second spaced-apart side walls connected by a cross wall, said first and second side walls defining first and second slots, respectively; and a retaining member for being positioned in said elongate member and having two oppositely extending end portions for each projecting through a different one of said slots and laterally beyond an associated one of said side walls to engage the outer surface of said one side wall, said retaining member defining a threaded bore for threadingly receiving the threaded shank of said fastener.

10. A telescoping assembly comprising:

a first end plate defining an aperture;

a second end plate defining an aperture;

a first channel member extending from said first end plate, said first channel member having first and second side walls connected by a cross wall, said first channel member first and second side walls defining first and second slots, respectively;

a second channel member extending from said second end plate, said second channel member having first and second side walls connected by a cross wall, said second channel member first and second side walls defining first and second slots, respectively, the distance between said first and second side walls of said second channel member being greater than the distance between said first and second side walls of said first channel member, said first channel member being telescopically received in said second channel member;

two identical retaining members each defining a threaded bore, each said retaining member having two oppositely extending end portions defining a first pair of spaced-apart projecting engaging surfaces and a second pair of spaced-apart projecting engaging surfaces with the distance between the engaging surfaces of the second pair of engaging surfaces being greater than the distance between the engaging surfaces of the first pair of engaging surfaces, one of said two retaining members being positioned through the first and second slots of said first channel member with said first pair of spaced-apart projecting engaging surfaces engaging the first channel member side walls below the associated slots, the other one of said two retaining members being positioned in said first and second slots of said second channel member with said second pair of spaced-apart projecting engaging surfaces engaging said second channel member side walls below the associated slots;

a first fastener having a head engaging said first end plate and having a threaded shank extending through said first end plate aperture and into said one retaining member threaded bore for threadingly engaging said one retaining member in said first channel member; and a second fastener having a head engaging said second end plate and having a threaded shank extending through said second end plate aperture and into said other retaining member threaded bore for threadingly engaging said other retaining member in said second channel member.

* * * * *